United States Patent Office 3,540,199
Patented Nov. 17, 1970

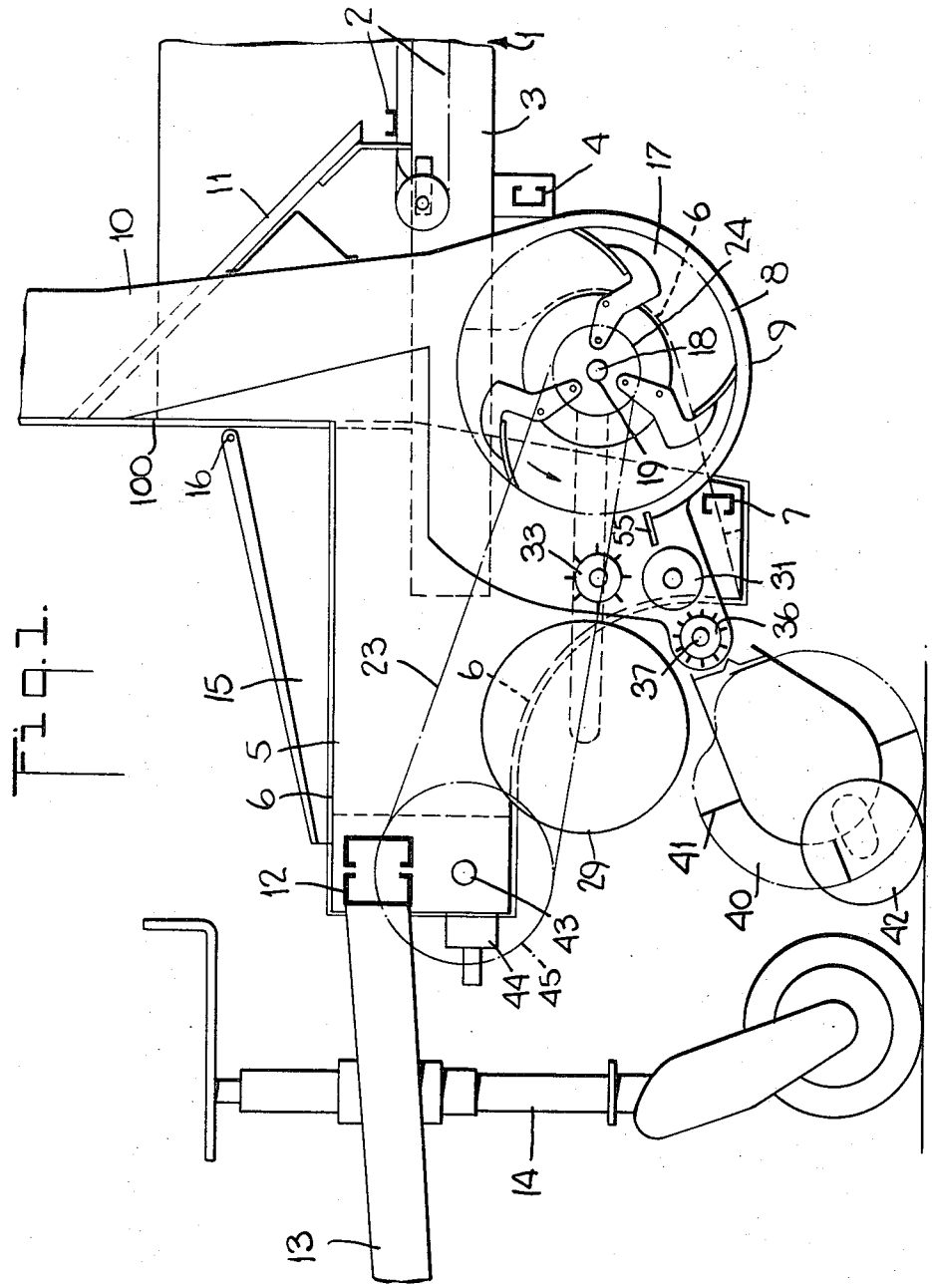

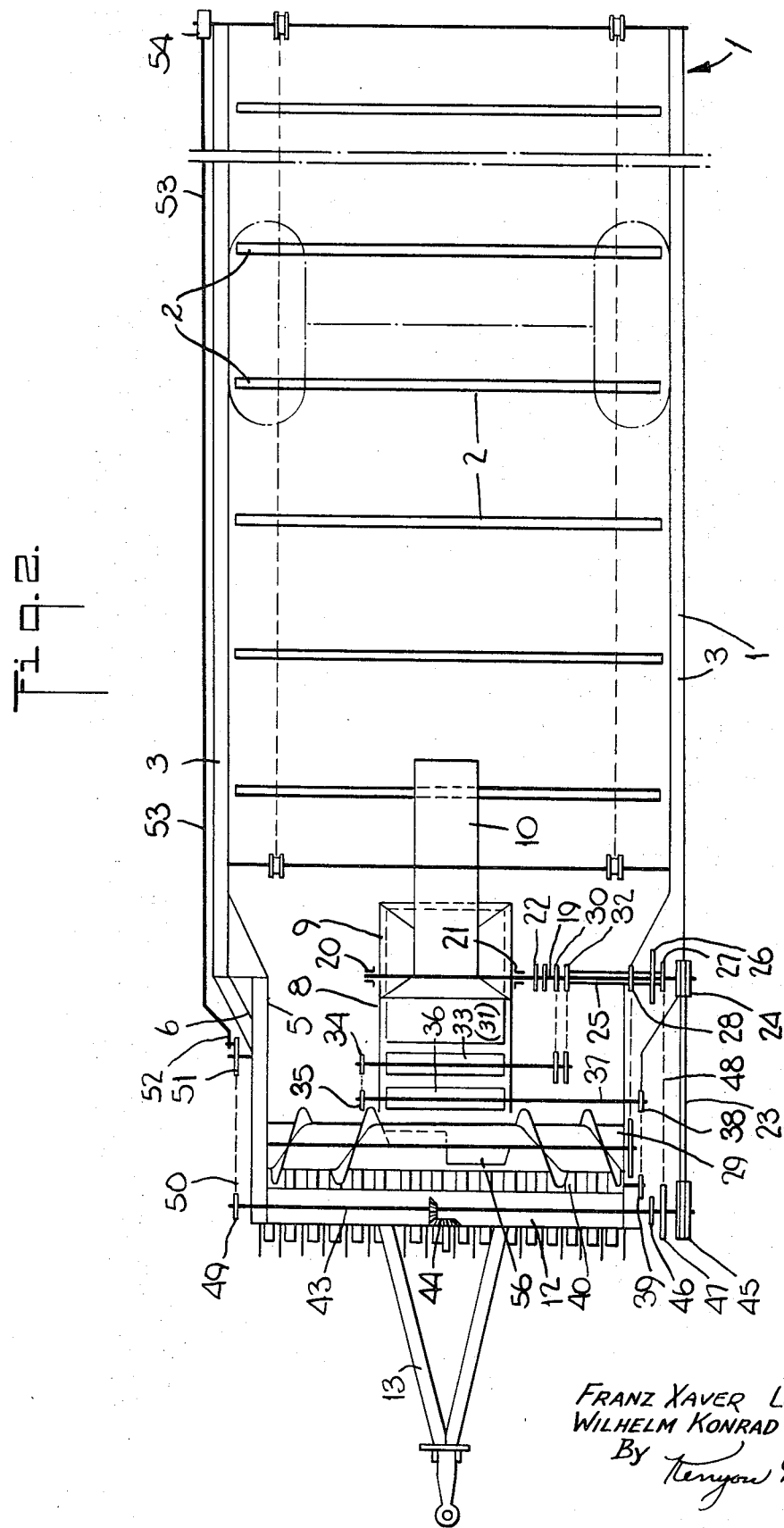

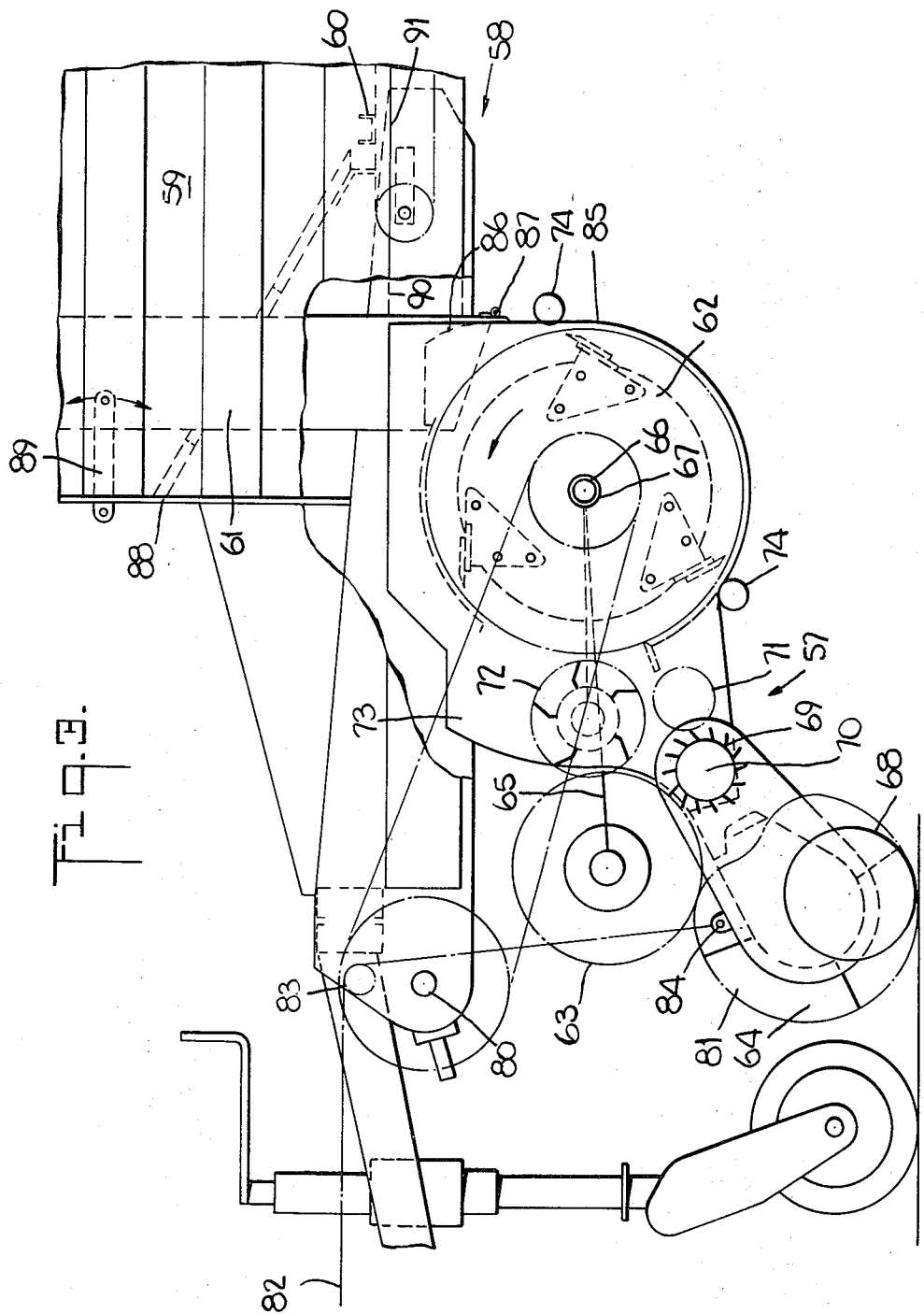

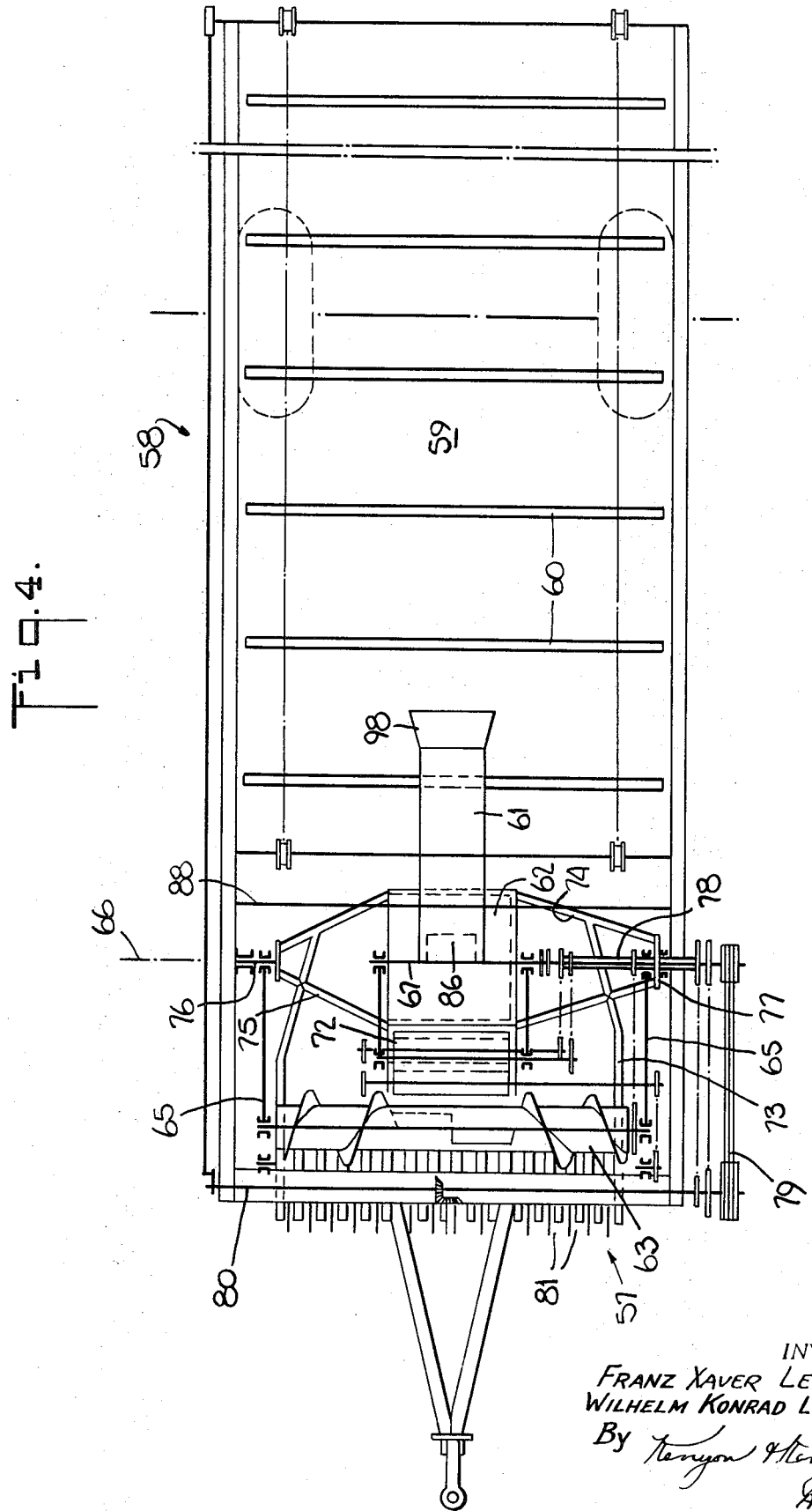

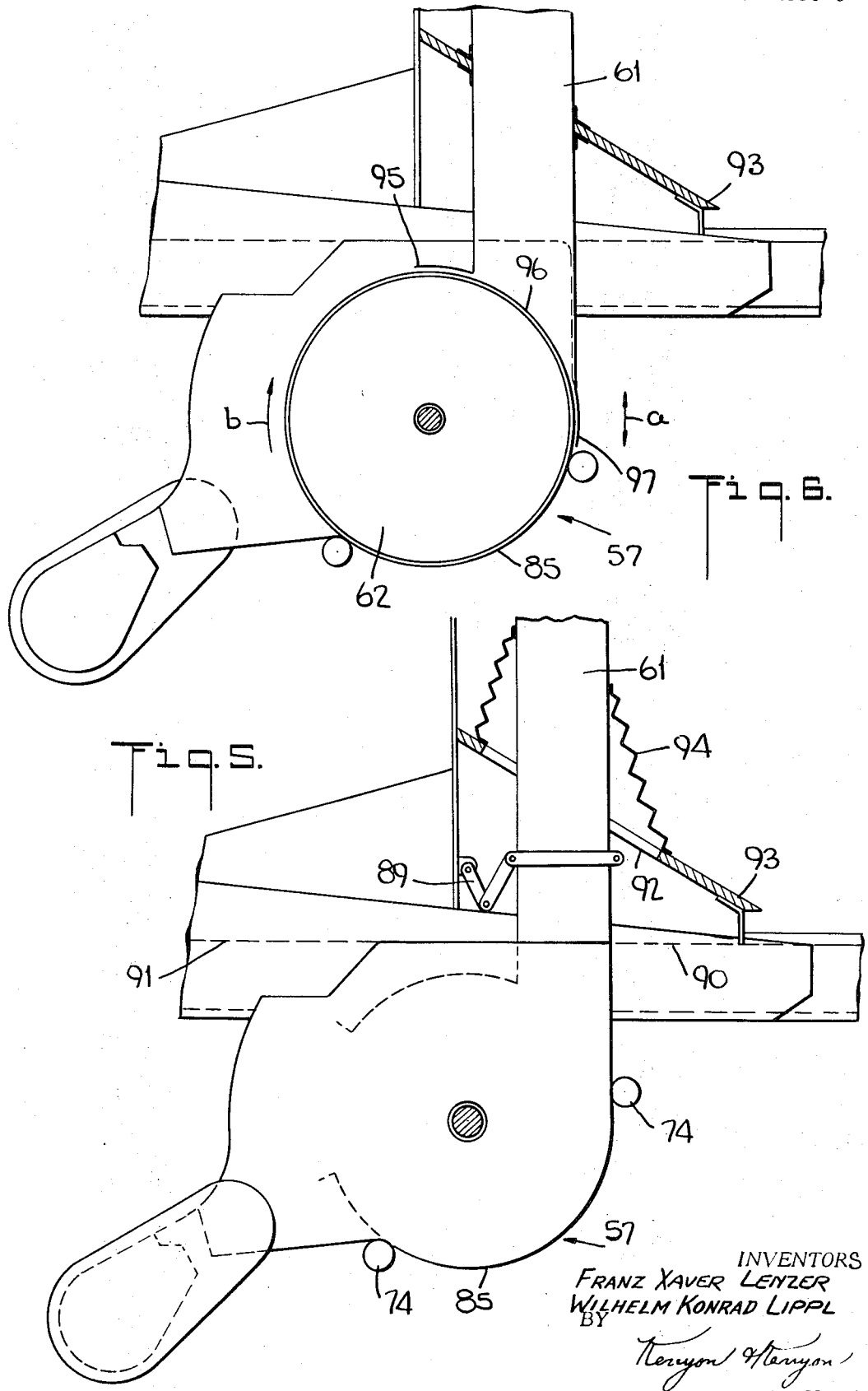

3,540,199
FIELD CART WITH CHAFFCUTTER
Franz Xaver Lenzer, Kleinkotz, near Gunzburg, and Wilhelm Konrad Lippl, Oxenbronn, near Gunzburg, Germany, assignors to Mengele & Soehne, Gunzburg (Danube), Germany, a firm of Germany
Filed Apr. 27, 1966, Ser. No. 545,721
Claims priority, application Germany, May 7, 1965, M 65,151; Feb. 19, 1966, M 68,459
Int. Cl. A01d 89/00, 55/00
U.S. Cl. 56—364                                        20 Claims

ABSTRACT OF THE DISCLOSURE

The chaffcutter is arranged underneath the loading space of a field cart with the ejecting duct rising within the loading space within the field cart. The chaffcutter is of the drum type and includes a cutter drum which is either rigidly mounted with respect to the cart or is mounted in a casing which pivots about the cutter axis with respect to the field cart.

---

The present invention relates to a field cart provided with a scraper bottom or conveyer and with a chaffcutter which is placed in the middle of either the forward or of the rear end of the cart.

It has been proposed to attach a chaffcutter of the beater, disk wheel or drum type to the forward or to the rear end of a field cart whose loading space is provided with a rolling or scraping bottom and which has a closing flap at the rear or front end of a box superstructure, affording unloading of the cart by means of the rolling bottom.

In single-axle vehicles the chaffcutter which has considerable weight is placed forward of the loading space and the bent ejecting or discharge duct rises in front of the vehicle. This conventional arrangement requires long longitudinal girders extending far forward of the cart and connected by means of a crossbar. This results in a long and unflexible vehicle which puts an excessive load on the rear wheels of the tractor because only a small portion of the load rests on the cart wheels. In two-axle vehicles the load is not uniformly transmitted to the wheels. Operation on soft ground is difficult with both arrangements.

Of disadvantage in the aforedescribed structures and also in conventional arrangements wherein the chaffcutter is connectable to the cart, is the needed great length of the discharge tube or duct. Aside from the weight and the unfavorable distribution of the weight as well as the bulkiness of the high overhanging discharge tube structures, the air flow resistance and the frictional resistance in the discharge tube is very high. Power is required to overcome these resistances. So far, this great power requirement was the main obstacle against general use of field chaffcutters.

It is an object of the invention to provide a combination of a load carrying cart with a field chaffcutter whereby low weight at uniform weight distribution is accompanied by great maneuverability and whereby the loading capacity of the chaffcutter is utilizable at greatest efficiency.

This object of the invention is fundamentally achieved by the arrangement of a drum type field chaffcutter underneath the loading space of a field cart whereby the ejecting tube rises within the loading space inside the front or rear wall thereof. According to the invention the front or rear wall may be extended forwardly or rearwardly whereby additional loading space is obtained because the spaces available at the sides of the discharge tube can be used for loading and the distance between the crossbar and the loading space can be made considerably shorter than in conventional field cart and chaffcutter combinations.

In single-axle carts a pole supported by a roller may be connected to the crossbar. It is not difficult to place the chaffcutter below the rear of the cart, as a modification of the invention.

According to the invention declining slide plates may be placed in the loading spaces provided according to the invention laterally of the ejecting tube, which slide plates may be extended downward to the conveyor at the bottom of the cart so that the additional loading spaces are automatically emptied when the cart is unloaded.

It is of advantage to form part of the wall of the discharge duct by part of the front or rear wall of the cart.

For supporting the drum type chaffcutter sheet metal walls are connected to the forward ends of the longitudinal girders at both sides of the cart and reinforced by suitable ribs connected by a lower and an upper transverse rail carrying the chaffcutter. These walls are somewhat contracted toward the middle of the width of a swingable receiving drum and of a screw conveyer, the latter being swingable around the axis of the chaffcutter. The forward ends of these walls are connected by a crossbeam to which a pole is connected.

According to the invention the chaffcutter is covered between the forward crossbeam and the front wall of the cart by a hood which can be folded upwardly. This hood protects the chaffcutter when it is in operation as well as when the arrangement travels on the road.

In a modification of the invention the receiving drum with the receiving elements and the cutter drum are rigidly mounted in a casing which is swingable around the axis of the shaft of the cutter drum, means being provided for permitting movement of the discharge tube relative to the housing of the chaffcutter and/or the bottom of the cart. The casing is preferably supported by traverses which terminate in shaft butts laterally of the housing of the chaffcutter, the shaft butts being rotatably supported by the frame of the cart. According to the invention arms are swingably supported by the shaft butts which arms carry the screw conveyer. One of the shaft butts is hollow to form a bushing through which the drive shaft of the chaffcutter extends.

It is a further object of the invention to provide in arrangements as described above means for affording relative movement of the chaff discharge tube and the housing of the chaffcutter and/or the bottom of the cart. In one embodiment the discharge tube is rigidly connected to the housing or casing of the chaffcutter and, if desired, is connected to the front wall of the cart by means of an articulation. The bottom or floor of the cart and, if necessary, also a slide plate are provided with cutouts through which the discharge tube extends. The discharge tube and the cart floor or the slide plate may be connected by a flexible cuff. In another modification the discharge tube is connected to the outlet opening of the cutter drum or to a discharge stub arranged thereon by an intermediate element affording relative movement of the discharge tube or duct and the chaffcutter. This intermediate element may be in the form of a discharge stub rigidly connected to the cutter drum and surrounded by a jacket arranged on the lower end of the discharge tube. In a further modification the intermediate element is in the form of a partial cylinder wrapping the drum around the outlet opening thereof. This partial cylinder preferably has a portion closing the outlet opening when the cutting assembly is in raised position for travel on the road. The intermediate element may be made of yielding metallic, thermoplastic or rubber-elastic material.

The arrangement according to the invention is not only of advantage because the cart can be made rather short and therefore easily maneuverable but also because the weight of the chaffcutter is small and a considerable part thereof rests on the wheels of the cart. The weight of the entire work and transport implement according to the invention is small and relatively great loads can be transported on relatively soft ground.

The discharge tube rising inside the loading space has the advantage over conventional arrangements that it is short, has less weight, is less bulky and can be conveniently dismantled and stored. The air flow and frictional resistance is so much reduced that less horse power are required for operating the chaffcutter than with conventional arrangements.

The discharge end of the ejecting tube or duct may be made as wide as the cart without appreciably increasing friction.

The weight of the swingable portion of the arrangement may be fully or partly counterbalanced, for example, by a tension spring. This does not only facilitate swinging up for road travel but also takes load off the feeler wheels.

The novel features which are considered characteristic of the invention are set forth with particularity in the appended claims. The invention itself, however, and additional objects and advantages thereof will best be understood from the following description of embodiments thereof when read in connection with the accompanying drawing, wherein:

FIG. 1 is a schematic longitudinal sectional view of the forward portion of a field cart and of a drum-type chaffcutter connected thereto according to the invention.

FIG. 2 is a schematic plan view of the arrangement shown in FIG. 1.

FIG. 3 is a schematic side elevation of a modified arrangement according to the invention.

FIG. 4 is a schematic top view of the arrangement shown in FIG. 3.

FIG. 5 is a schematic sectional view of a modified detail of the arrangements shown in FIGS. 1 to 4.

FIG. 6 is a schematic sectional view of a modification of the detail shown in FIG. 5.

Referring more particularly to FIGS. 1 and 2 of the drawing numeral 1 designates a single-axle field cart which is provided with a scraper bottom 2. A transverse beam 4 and sheet metal walls 5 are mounted on the forward ends of longitudinal support beams 3, the sheet metal walls 5 extending beyond the forward ends of the beams 3. The sheet metal walls 5 are provided with reinforceing ribs 6 and connected by a transverse beam or girder 7. The casing 9 of a drum-type field chaffcutter 8 is mounted on the beams 4 and 7 below the loading space of the field cart 1. An ejecting or discharge duct 10 is connected to the casing 9 and extends upwardly through the loading space of the cart 1. The duct 10 has an upper part, not shown, which is curved rearwardly. The field cart 1 has an end wall 100 which forms a portion of the wall of the discharge duct 10. Slideways 11 are placed on either side of the duct 10. The slideways decline toward the scraper bottom or conveyor 2 and terminate thereabove. The chaff accumulated at the sides of the duct 10 glides downward on the slideways 11 when the cart is unloaded by means of the conveyor 2.

A crossbeam 12 is connected to the forward ends of the walls 5. A pole 13 supported by a roller or wheel 14 is mounted on the crossbeam 12. The chaffcutter 8 and associated elements are covered by a hood 15 which is connected to the forward wall of the cart by means of a hinge 16 and can be lifted by swinging it around the hinge.

The chaffcutter 8 comprises a cutting device 17 which rotates around an axis 18 in the direction of the arrow shown in FIG. 1. The chaffcutter also performs a conveying function as is well known by conveying the cut material into the discharge duct 10. A counter cutter 55 is mounted on the casing 9. A two-piece drive shaft 19 is supported by bearings 20 and 21 on the casing 9 and connected by a chain coupling 22. A drive pulley 24 is connected to the left end of the shaft 19, seen in the direction of travel of the vehicle, and is driven by a V-belt 23. The left portion of the shaft 19 is surrounded by a hollow shaft 25 whereto sprocket wheels 26 and 27 are connected for driving the shaft 25. A sprocket wheel 28 connected to the shaft 25 drives via a chain a screw conveyer 29 which is supported for swinging around the axis 18. A sprocket wheel 30 on the shaft 19 drives a lower press roll 31 through a chain. A sprocket wheel 32 drives an upper press roll 33 through a suitable chain. The press roll 33 is supported for swinging around the axis 18. The lower press roll 31 drives a feed roll 36 through a chain drive comprising sprocket wheels 34 and 35. A shaft 37 connected to the lower feed roll drives through a chain looped around sprocket wheels 38 and 39 a receiving drum 40 which is swingable around the shaft 37. The points of prongs 41 on the receiving drum 40 travel along the dash-dot line shown in FIG. 1. The receiving drum is provided with adjustable leading feeler wheels 42.

The chaffcutter is driven by a shaft 43 which is placed below the crossbeam 12 and which is driven at the middle by a power take-off shaft through bevel gear 44. To the left end of the shaft 43, looking in the travel direction of the implement, a belt pulley 45 is connected for driving the V-belt pulley 24 through the V-belt 23. Also connected to the shaft 43 are sprocket wheels 46 and 47 for driving the sprocket wheels 26 and 27 by means of achain 48 which may be selectively looped around the sprocket wheels 46, 26 or 47, 27. In this way two different chaff cutting lengths can be obtained.

A sprocket wheel 49 is connected to the right end of the shaft 43, looking in the travel direction of the cart. The wheel 49 drives a sprocket wheel 51 by means of a chain 50. The wheel 51 forms a crank which operates through a connecting rod 53 a drive 54 for advancing the conveyor 2.

Placing the chaffcutter beneath the loading space of the cart makes it possible to omit a chain feeder and to effect feeding by the feed roll 36. The material to be cut is conveyed by the screw conveyer 29 to vanes 56 in the middle of the shaft 29 which, in cooperation with the press roll 33, feed the material to the mouth of the chaffcutter.

FIGS. 3 and 4 show another arrangement according to the invention of a drum type field chaffcutter assembly 57 placed in the middle of the forward end of a field cart 58 beneath the load space 59 thereof. The bottom of the cart 58 is formed by a conveyer provided with scrapers 60.

The discharge duct 61 of the chaffcutter extends upward through the loading space 59. The chaffcutter 57 comprises a cutter drum 62 and a screw conveyor 63 which is placed above a receiving drum 64. The screw conveyor 63 is mounted on arms 65 which are swingable around the axis 66 of a chaffcutter drive shaft 67.

In the embodiment of the invention shown in FIGS. 1 and 2 the casing 9 of the chaffcutter 8 is rigidly connected to the frame of the cart by means of crossbeams and the receiving drum 40 with ground feeler wheels 42 is swingable around the axis of a feed roll 36.

In the embodiment shown in FIGS. 3 and 4 the chaffcutter drum 62 with the feed roll 69, a lower press roll 71 and an upper press roll 72 which is swingable around the cutter shaft 67 are combined with the receiving drum 64 in a casing 73 which is swingable around the axis 66. The casing 73 is supported by traverses 74 and 75 (see FIG. 4) the outer ends whereof form shaft butts 77 and 76, respectively, resting in suitable bearings mounted on the frame of the cart 58. The butt 77 is hollow and forms a sleeve surrounding a portion of a concentric hollow shaft 78 through which extends the cutter shaft 67. The cutter shaft 67 is driven by a shaft 80 through a V-belt 79. The hollow shaft 78 is also driven by the shaft 80 through a chain drive. The feed roll 69, the press rolls 71 and 72 and the receiving drum 64 receive drive from the shafts 67 and 78.

The aforedescribed arrangement operates as follows:

The drawing shows the arrangement in operating position whereby the wheels 68 roll on the ground an lift or lower the casing 73 with the receiving drum 64 in front thereof by swinging around the axis 66 to follow the uneveness of the ground. The screw conveyor 63 swings independently around the axis 66, permitting change of the position of the screw conveyer 63 relative to the feed roll 69 for accommodating changing quantities of chaff supplied by the receiving drum. The slotted plates 81 of the receiving drum cannot move toward the screw conveyor 63, as is the case in the arrangement shown in FIGS. 1 and 2, and cannot hinder flowing in of the material to be cut.

For travelling on the road the chaffcutter assembly 57 is lifted by a rope 82 connected to an ear 84 mounted on the casing 73. The rope runs over a roller 83 to a tractor, not shown. The assembly 57 is held in the lifted position by conventional locking means, not shown.

In order to prevent impairment of the swinging of the chaffcutter assembly when doing field work and to make it possible to lift the assembly for road travel, the bottom of the discharge duct 61 is formed to surround a tubular discharge stub 86 provided on the casing 85 of the chaffcutter and is hinged to said casing at 87 so that the stub 86 can move in the lower end of the duct when the assembly oscillates around the axis 66 when operating on rough ground.

When the chaffcutter assembly 57 is swung up for road travel the discharge duct 61 rolls on the curved end portion of the discharge stub 86. The upper part of the duct 61 is rockably connected at 89 to the front end wall 88 of the field cart 58 so that the duct 61 can yield vertically. A longitudinal slot 90 in the bottom 91 of the cart affords movement of the duct 61 longitudinally of the cart.

In the embodiment of the invention shown in FIG. 5 the discharge duct 61 is rigidly connected to the casing 85 of the chaffcutter and the bottom 91 of the cart is provided with a longitudinal slot 90. The duct 61 is connected to the front end wall of the cart by means of an articulation 89 and can follow oscillations of the chaffcutter assembly 57. An aperture 92 in a slanted plate 93 is sealed by a rubber cuff 94.

In the embodiment of the invention shown in FIG. 6 the lower end of the discharge duct 61 terminates in a partial cylinder 95 which surrounds an outlet aperture 96 in the casing 85 so that at oscillations of the casing in the directions of the double arrow $a$ the ejected cut chaff can freely enter the duct 61.

When the chaffcutter assembly 57 is swung as indicated by arrow $b$ for road travel the portion 97 of the partial cylinder 95 closes the outlet aperture 96, protecting the chaffcutter drum 62 against fouling.

As seen in FIG. 4 the upper end 98 of the discharge duct is flared and may extend over the entire width of the cart, since with the arrangement according to the invention an extraordinarily great energy is available for ejecting the cut chaff.

What is claimed is:

1. A field cart comprising:
    a loading chamber for receiving a load,
    a conveyor bottom in said loading chamber for moving the received load from one end of said loading chamber to an opposite end of said loading chamber;
    a discharge duct extending vertically upwardly through and in said one end of said loading chamber and being of less width than said loading chamber for transferring material into said loading chamber to the front and sides of said duct; and
    a chaffcutter assembly disposed below the plane of said loading chamber and having means for cutting and conveying the received material to said discharge duct for discharge into said loading chamber.

2. A field cart as defined in claim 1 having a single axle, and an end wall, said discharge duct being placed adjacent said end wall.

3. A field cart according to claim 2 wherein said conveyor bottom has an end spaced from said end wall, and declining plates are placed on either side of said discharge duct and terminate adjacent said end of said conveyer bottom.

4. A field cart as defined in claim 1 comprising laterally spaced longitudinal support beams having end portions, sheet metal walls having reinforcing ribs and being connected to said end portions, a transverse girder interconnecting said sheet metal walls, said sheet metal walls having outer end portions, and a crossbeam connecting said outer end portions of said sheet metal walls.

5. A field cart as defined in claim 4 comprising a transverse beam interconnecting said longitudinal support beam; said chaffcutter assembly comprising a cutter drum connected to said transverse girder and to said transverse beam for support thereby.

6. A field cart according to claim 4 comprising a pole connected to said crossbeam, and a supporting wheel connected to said pole.

7. A field cart as defined in claim 1 comprising an end wall, and a hood hinged to said end wall for covering a portion of said chaffcutter assembly.

8. A field cart as defined in claim 1 comprising an end wall, said discharge duct having a wall portion formed by a portion of said end wall.

9. A field cart as defined in claim 1 wherein said chaffcutter assembly comprises a casing, a receiving drum for receiving the material to be cut, a cutter drum, and feed elements for feeding the material to be cut from said receiving drum to said cutter drum, said receiving drum, said cutter drum, and said feed elements being mounted inside said casing, said casing being swingable around the axis of said cutter drum, and means are provided affording relative movement of said discharge duct and said cutter drum.

10. A field cart according to claim 9 comprising a cart frame, traverses supporting said casing, said traverses having end portions formed as butts, said butts being coaxial with said cutter drum and supported by said cart frame.

11. A field cart according to claim 10 comprising arms swingably connected to said butts, and a screw conveyor connected to the free ends of said arms for affording swinging of said screw conveyor around the axis of said cutter drum.

12. A field cart according to claim 10 comprising a drive shaft extending coaxially from said cutter drum, one of said butts being hollow and forming a sleeve through which said drive shaft extends.

13. A field cart as defined in claim 1 wherein said chaffcutter assembly comprises a casing, a receiving drum for receiving the material to be cut, a cutter drum, and feed elements for feeding the material to be cut from said receiving drum to said cutter drum, said receiving drum, said cutter drum, and said feed elements being mounted inside said casing, said casing being swingable around the axis of said cutter drum, said cart comprising an end wall, and a declining plate extending from said end wall to said conveyor bottom and having an aperture through which said discharge duct extends, said discharge duct being rigidly connected to said cutter drum, flexible means being provided for connecting said discharge duct to said end wall, and a flexible cuff being connected to said discharge duct and to said declining plate for sealing said aperture.

14. A field cart as defined in claim 1 wherein said chaffcutter assembly comprises a casing, a receiving drum for receiving the material to be cut, a cutter drum, and feed elements for feeding the material to be cut from said receiving drum to said cutter drum, said receiving drum, said cutter drum, and said feed elements being mounted inside said casing, said casing being swingable around the axis of said cutter drum into an operating and into a rest position, said cutter drum having an outlet, and said discharge duct being movably connected to said outlet.

15. A field cart according to claim 14 wherein said discharge duct has a lower end portion and said outlet forms a tubular stub slidably extending into said lower end portion of said discharge duct.

16. A field cart according to claim 14 wherein said discharge duct has a lower end portion, a partial cylinder whose axis is normal to the axis of said discharge duct and concentric with said cutter drum being connected to said lower end portion and having an aperture conforming with the flow area of said lower end portion of said discharge duct, said cutter drum having an outlet opening substantially registering with said aperture when said casing is in operating position.

17. A field cart as set forth in claim 1 wherein said loading chamber has an upstanding wall forming a wall of said discharge duct and a pair of side walls spaced from said discharge duct, and which further includes a plurality of plates extending on an incline from said discharge duct downwardly to said conveyor bottom in the space between said side walls and said discharge duct.

18. A field cart as set forth in claim 1 further comprising longitudinal beams supporting said loading chamber, a cross beam mounted across said longitudinal beams, and a supporting beam mounted from said longitudinal beams, said chaffcutter assembly being supported on said cross beam and supporting beam.

19. A field cart as set forth in claim 1 further comprising a pole extending from said loading chamber and a wheel mounted on said pole for transporting the cart.

20. A field cart comprising:
- a loading chamber for receiving a load;
- a conveyor bottom in said loading chamber for moving the received load from one end of said loading chamber to an opposite end of said loading chamber;
- a discharge duct extending vertically upwardly through and in said one end of said loading chamber, said duct being of less width than said loading chamber for transferring material into said loading chamber to the front and sides of said duct; and
- a chaffcutter assembly disposed below the plane of said loading chamber, said assembly including a drum type cutting device below said duct for cutting and ejecting the cut material to said duct and means for feeding material to said cutting device.

References Cited

UNITED STATES PATENTS

| | | |
|---|---|---|
| 2,570,147 | 10/1951 | Morrissey. |
| 2,641,097 | 6/1953 | Mast. |
| 2,847,811 | 8/1958 | Martin et al. ____ 146—107 XR |
| 2,926,477 | 3/1960 | Bebow. |
| 3,252,277 | 5/1966 | Weichel _____ 56—364 XR |

W. GRAYDON ABERCROMBIE, Primary Examiner

U.S. Cl. X.R.

146—107